(12) United States Patent
Moore

(10) Patent No.: US 7,013,596 B1
(45) Date of Patent: Mar. 21, 2006

(54) CHEST FLY BOX SYSTEM

(76) Inventor: Jerry Thomas Moore, 3416 Iris Ct., Boulder, CO (US) 80304

( * ) Notice: Subject to any disclaimer, the term of this patent is extended or adjusted under 35 U.S.C. 154(b) by 577 days.

(21) Appl. No.: 09/636,731

(22) Filed: Aug. 10, 2000

(51) Int. Cl.
*A01K 97/00* (2006.01)

(52) U.S. Cl. ......................... 43/54.1; 43/21.2; 224/922; 224/920

(58) Field of Classification Search ................ 43/21.2, 43/54.1; 224/920, 922
See application file for complete search history.

(56) References Cited

U.S. PATENT DOCUMENTS

| | | | | |
|---|---|---|---|---|
| 1,198,202 A | * | 9/1916 | Drinkard | 224/920 |
| 1,549,400 A | * | 8/1925 | Wimler | 43/54.1 |
| 1,736,337 A | | 11/1929 | Borel | |
| 2,018,606 A | * | 10/1935 | Cumings | 224/922 |
| 2,171,676 A | * | 9/1939 | Wallace | 224/922 |
| 2,474,752 A | | 6/1949 | Montgomery | |
| 2,538,677 A | * | 1/1951 | Ferrand | 224/920 |
| 2,539,302 A | | 1/1951 | Fye | |
| 2,709,544 A | * | 5/1955 | Barringer | 224/920 |
| 2,817,472 A | * | 12/1957 | Parkhurst | 224/922 |
| 2,853,709 A | * | 9/1958 | Peterson | 224/920 |
| 2,999,621 A | * | 9/1961 | Kiser | 224/922 |
| 3,062,421 A | * | 11/1962 | Fleming | 224/920 |
| 3,282,482 A | * | 11/1966 | Scharsu | 224/920 |
| 3,537,628 A | * | 11/1970 | Thompson | 224/922 |
| 4,529,112 A | * | 7/1985 | Miller | 224/610 |
| 4,739,914 A | | 4/1988 | Pothetes | |
| 4,765,470 A | | 8/1988 | Curci | |
| 4,802,612 A | * | 2/1989 | Anderson | 224/625 |
| 4,831,772 A | * | 5/1989 | Gillespie | 43/54.1 |
| 4,892,241 A | * | 1/1990 | Mavrakis | 224/216 |
| 5,505,354 A | * | 4/1996 | Hutton | 224/196 |
| 5,571,228 A | * | 11/1996 | McMurtrie | 43/21.2 |
| 5,950,352 A | * | 9/1999 | Volmer | 43/54.1 |
| 5,975,393 A | * | 11/1999 | Bellamy | 224/655 |
| 6,036,067 A | * | 3/2000 | Alcorn | 224/153 |
| 6,052,939 A | | 4/2000 | McClain et al. | |
| 6,267,276 B1 | * | 7/2001 | Cook | 224/183 |

FOREIGN PATENT DOCUMENTS

CH        586030 A     3/1977

OTHER PUBLICATIONS

Richardson Chest Fly Box Company, "Excerpts from website," www.chestflybox.com, p. 1-11 (Jun. 12, 2000).
Cabelas, "May Fly Accessories," www.cabelas.com/texis, p. 1-2 (Nov. 9, 2000).
Downstream Products, "Fly Fishing With Downstream Products And Their Chest Fly Box," www.d-stream.com, p. 1-6 (Jun. 12, 2000).
Xstream Gear, "Fly Fishing Chest Pack," www.xstreamgear.com, p. 1 (Jun. 12, 2000).

(Continued)

*Primary Examiner*—Kurt Rowan
(74) *Attorney, Agent, or Firm*—Patton Boggs LLP

(57) ABSTRACT

A chest fly box system having a harness, a base piece for supporting a fly box, and rotatable, hinged fasteners that secure fly boxes of various dimensions at the chest of a fisherman. The rotatable, hinged fasteners comprise hook-and-loop fasteners. The system may include a fishing rod holder that supports a fishing rod in a substantially horizontal orientation, freeing the hands of a fisherman. A bottle holder comprising resilient tubing holds fluid bottles in a horizontal orientation in an easily accessible location. The chest fly box system comprises soft material at the surface in contact with the chest of the fisherman. The soft material may include a pocket.

26 Claims, 8 Drawing Sheets

OTHER PUBLICATIONS

Fishing Wholesale Inc, "World Gear Chest Pack," fishingwholesale.bizland.com, p. 1 (Jun. 12, 2000).
Hunting Fishing Inc., "Sandpiper Chest Pack," www.fishing-boating.net, p. 1 (Jun. 12, 2000).
Clear Creek, "Chest/Fanny Packs & Fishing Satchel Bag," www.clearcreek.net, p. 1-2 (Jun. 12, 2000).
C.C. Filson Co., "Fly Fishing Tackle Pack," www.ccfilson.com, p. 1 (Jun. 12, 2000).
Jerry Gibbs, "Fly-Fishing: Bridger Mountain Pack," outsidemag.com, p. 1 (Jun. 12, 2000).
Roundrocks Fly Fishing, "JW Outfitters Hot Creek II Chest Pack," www2.roundrocks.com, p. 1 (Jun. 12, 2000).
Roundrocks Fly Fishing, "JW Deluxe Troutpack," www2.roundrocks.com, p. 1 (Jun. 12, 2000).
Roundrocks Fly Fishing, "Buck's Bags Chest/Fanny Pack Combo," www2.roundrocks.com, p. 1 (Jun. 12, 2000).
Roundrocks Fly Fishing, "Buck's Split Chest Pack," www2.roundrocks.com, p. 1 (Jun. 12, 2000).
Roundrocks Fly Fishing, "ACC-BW Chest Vest I Forest GR (Small Fly Box) and ACC-BW Chest Vest II Forest GR (Large Fly Box)," www2.roundrocks.com, p. 1-2 (Jun. 12, 2000).
Ultimate Angler, "Fly Fishing Systems," ultimateangler.com, p. 1 (Jun. 12, 2000).
Epinions.com, "Patagonia Chest Pack," jtfourh. epinions.com, p. 1 (Jun. 12, 2000).
Wood River, "Alaskan Chest Pack," www.woodrivercompany.com, p. 1 (Jun. 12, 2000).

* cited by examiner

CHEST FLY BOX SYSTEM

BACKGROUND OF THE INVENTION

1. Field of the Invention

The invention relates to a system for carrying fishing equipment, and particularly to a system for carrying a pocket-sized fly box at chest height and for holding a fishing rod.

2. Statement of the Problem

Fishermen on streams and rivers typically carry with them a wide variety or assortment of fishing flies, lures and accessories. Various boxes and trays of many types have been constructed that are small and portable enough to be worn by a fisherman during the time that he is fishing so that the fisherman has convenient access to the contents of the box. A simple form of such a fishing fly box is a small container that may be clipped or otherwise attached to a fisherman's belt. Another form of a fly box that provides storage space for a large number of items in a number of lure or fly compartments is a so-called chest fly box. A chest fly box is worn by the fisherman by means of a harness-like type of device which extends around the shoulders of the fisherman and maintains the box in approximate chest position on the front of the fisherman's body. Such a fly box is disclosed in U.S. Pat. No. 2,539,302, issued to Fye. Various examples of chest fly boxes are commercially available.

While fishing, it is common for a fisherman to change or replace frequently the lure, leader or other accessory on his fishing line. Manipulation and attachment of the fishing fly and tackle typically requires two hands, which means that the fisherman cannot hold his fishing rod at the same time. If the fisherman is on the shoreline, he may place the rod on the ground. This, however, is often undesirable because the ground does not provide stable support or because of the risk of fouling the fishing reel with dirt or detritus. If the fisherman is midstream, then he must tuck the rod under his armpit and attempt to complete the intended operation balancing the rod in this manner.

A useful feature of a conventional chest fly box is that the box lies flat against the chest of the fisherman when not open for exchanging contents. Typically, to open the box, two steps are required. First, some sort of mechanical latch is released that allows the box to rotate 90 degrees from the vertical to the horizontal position. Second, a top lid of the box is opened upwards to allow access to the inside of the box. It is common in the art to support the box in its horizontal position by means of a diagonal bracket on at least one side of the box. The diagonal bracket hinders access by the fisherman to the inside of the box. If no diagonal bracket is used, then the box is typically supported in the horizontal position by a hinge having a locking mechanism, subject to fatigue and failure.

Typically, a fisherman has a very large selection of lures, flies, and hooks to accommodate many varieties of fish and fishing conditions encountered throughout the year. For a given type of fish and a particular set of fishing conditions, a fisherman may be able to select a subset of flies and lures from his total collection to minimize the amount carried on his chest. This likely means, however, that the fishermen will need to take out and replace the contents of his chest fly box frequently, perhaps several times a day, to accommodate changing conditions and fish types. In view of the large variety of lures and other devices usually required to accommodate changing times of day, water conditions, weather and feeding patterns, some conventional fly box systems include two or three or even five separate trays, all attached to each other, and all located on the chest of the fisherman. The trays cannot be separated from or replaced by other trays. In other multi-tray systems, a tray may be switched out and replaced by another tray, but all of the trays used in this manner must be an integral part of the system; that is, a fisherman is restricted to using only those fly trays that have been specially designed and manufactured for integration with the system. A common problem with all of these multi-tray systems is that they add bulk and weight to the burden located on the chest of the fisherman. Also, the attachment mechanism on such modular trays typically includes bulky and sharp-edged components, and prevents efficient transport and storage of the trays when they are not attached to the chest fly box system. The idea of a multi-tray system with interchangeable trays is that the fisherman can replace one or several trays with trays containing fishing flies and lures most suitable for the particular conditions of the moment. A typical problem of conventional chest fly box systems is that the process of switching out a tray is complicated and cumbersome, especially when performed in the field. For example, a common attachment system includes a hinge comprising annular portions on opposing edges that must be lined up so that a rod can be passed through the aligned annular spaces, similar to the hinge mechanism on a house door. Attaching a tray to a chest fly box system in the field, where dirt, water, insects, wind, heat and cold commonly interfere, may be difficult to accomplish.

Construction material of a conventional chest fly box is typically a hard plastic or a metal, such as aluminum. When the fisherman is wearing light clothing on his torso, the hard rectangular edges of the box can be a source of discomfort and irritation. This is especially true for the heavier, multi-tray systems. On a hot day, when the chest-side of the box is pressed by the heavier weight against the skin of the fisherman, air circulation is hindered, resulting in uncomfortable perspiration.

It is common for fishermen to carry various liquid solutions as accessories; for example, a fly drying solution and a fly wetting solution. Various methods have been developed in the art for holding a solution. Some systems comprise a container holder in which the container is held upright; if the solution becomes very viscous in cool weather, it will not easily flow out the top of the container. In other systems, the containers are held and operated upside down; the liquid in such containers may flow uncontrollably, especially in warm weather. Container holders are typically provided in fishing vests, jackets, belts or large tackle boxes, and as a result, they are not conveniently accessible or manipulatable.

A chest fly box system typically includes a harness with straps connected to the box that pass over the fisherman's shoulders and loop around under his arms. A harness is typically constructed using leather, canvas or a synthetic material, such as nylon. Often, the harness is bulkier than the fly box itself, making it inconvenient to transport and to store the chest fly box system.

3. Solution to the Problem

A feature of the present invention is a chest fly box system for holding fishing equipment, comprising: a base piece for supporting a pocket-sized fly box, a harness that secures the base piece to the body of a fisherman, and a fastener that secures one of a plurality of pocket-sized fly boxes on the base piece. A system in accordance with the invention is designed to accommodate pocket-sized fly boxes of different types, that is, pocket-sized fly boxes made by different manufacturers and having different dimensions and geometries. As a result, a fisherman may conveniently replace one fly box with another fly box to be carried at his chest, and the fly boxes need not be of a particular manufacturer or be specially designed for use in the chest fly box system.

Fasteners in accordance with the invention are configured to secure a pocket-sized fly box to the base piece when the fly box is in a vertical closed position and when it is in a horizontal flat position. To "secure" the pocket-sized fly box to the base piece can be done directly, with a fastener attached to the fly box and the base piece, or indirectly, for example, by a fastener attached to the fly box and to the harness, to which the base piece is secured.

An important feature of a chest fly box system in accordance with the invention is a fishing rod holder, the fishing rod holder contiguous to the base piece and configured to hold a fishing rod in a horizontal orientation under a pocket-sized fly box supported on the base piece. It is also contemplated by the invention to provide an embodiment of a fishing rod holder independent of a chest fly box system. A fishing rod holder for temporarily holding a fishing rod in a horizontal orientation comprises: a U-shaped trough, a clamp or other suitable mechanism suitable for holding a fishing rod in a substantially horizontal orientation; and a fastener that secures the rod-holding mechanism to the body of a fisherman, generally by means of an article of clothing or other piece of fishing gear. A common variation of such a general embodiment is a portable system for holding, storing and transporting fishing equipment, comprising: a fly box, and a fishing rod holder, the fishing rod holder attached to the fly box and configured to hold a fishing rod in a horizontal orientation.

In a typical chest fly box system in accordance with the invention, the base piece comprises a vertical chest plate and a horizontal support plate, the vertical chest plate and the horizontal support plate forming a right angle. The support plate width and the support plate length are adequate to support a pocket-sized fly box in its vertical closed position. Preferably, a fishing rod holder is attached to the base piece. Typically, the fishing rod holder comprises rigid construction material, such as a plastic or aluminum. In a typical chest fly box system in accordance with the invention, the fishing rod holder comprises a U-shaped trough having a length and a width, and an upper opening between the sides of the troughs. The upper opening and the width have dimensions adequate to accommodate and to hold securely a handle of a fishing rod aligned in the length direction. In the preferred embodiment of a chest fly box system, the outer edge of the support plate, the upper edge of the trough that is proximate to the support plate, and the upper edge of the trough that is distal from the support plate are in a single horizontal plane when the outer surface of the vertical chest plate is in a vertical plane. This provides support to the fly box when it is in the horizontal flat position. In a preferred embodiment of a chest fly box system, the outer edge of the support plate and the proximate upper edge of the fishing rod holder are formed by a bend in a single piece of construction material. The bend typically comprises a right angle. Typically, a chest fly box system in accordance with the invention is characterized by fasteners that secure a pocket-sized fly box to the base piece when the pocket-sized fly box is in a vertical closed position and when it is in a horizontal flat position. Typically, the harness of a chest fly box system in accordance with the invention is attached to an inner edge of the support plate and an upper edge of the chest plate. A preferred embodiment of a chest fly box system has slots between the support plate and the proximate upper edge of the rod holder at each of the two ends in the length direction of the rod holder. The harness typically comprises cloth and has a chest portion for covering a chest surface of the chest plate. The chest portion has a top and bottom, a sleeve portion at the top that encloses the upper edge of the chest plate, a first finger at the bottom having a first flange, and a second finger at the bottom having a second flange, the first finger located in one of the slots and being secured by the first flange, and the second finger located in the other slot and being secured by the second flange. In a preferred embodiment of a chest fly box system, the sleeve portion, the first flange and the second flange comprise hook-and-loop fabric that attaches to corresponding pieces of hook-and-loop fabric on a pocket-sized fly box when the pocket-sized fly box is located in a vertical closed position on the support plate.

An important feature of a chest fly box system in accordance with the invention is that the first flange and the second flange are rotatable 90 degrees about the outer edge of the support plate when a pocket-sized fly box to which the flanges are attached is rotated downwards from a vertical closed position on the support plate to a horizontal flat position. An additional feature of a chest fly box system in accordance with the invention is that the chest portion of the harness includes a pocket, the pocket having an opening at the top.

A chest fly box system in accordance with the invention preferably further comprises a bottle holder for holding a bottle in a horizontal position, the bottle holder attached to the bottom surface of the support plate. Typically, the bottle holder comprises resilient tubing having an inside diameter suitable for holding common bottle sizes; for example, neoprene rubber tubing having an inside diameter of 2.5 cm.

A chest fly box system for holding fishing equipment in accordance with the invention typically comprises: a base piece for supporting a pocket-sized fly box; and a hook-and-loop fastener having a hook portion and a loop portion, one of the hook-and-loop portions connected to the base piece, and the other of the hook-and-loop portions connected to the pocket-sized fly box. In particular, the portion connected to the base piece forms a rotatable hinge.

A chest fly box system for holding fishing equipment in accordance with the invention preferably comprises soft material on the chest-side surface of the chest plate. Preferably, the soft material includes a pocket for storing fishing equipment.

A chest fly box system for holding fishing equipment in accordance with the invention may comprise a base piece for supporting a pocket-sized fly box, and a bottle holder for holding a bottle in a horizontal position, the bottle holder being attached to the base piece. Typically, the bottle holder comprises resilient tubing having an inside diameter suitable for holding common bottle sizes; for example, neoprene rubber tubing having an inside diameter of 2.5 cm.

A method of securing a pocket-sized fly box to a base piece in accordance with the invention comprises: attaching one of a hook portion and a loop portion to the pocket-sized fly box; and attaching the other one of the hook portion and the loop portion to the base piece. In a preferred embodiment, a hook-and-loop fastener is attached in such a manner that it functions as a rotatable hinge.

Numerous other features, objects and advantages of the invention will become apparent from the following description when read in conjunction with the accompanying drawings.

DETAILED DESCRIPTION OF THE PREFERRED EMBODIMENT

1. Overview

Figure 1:
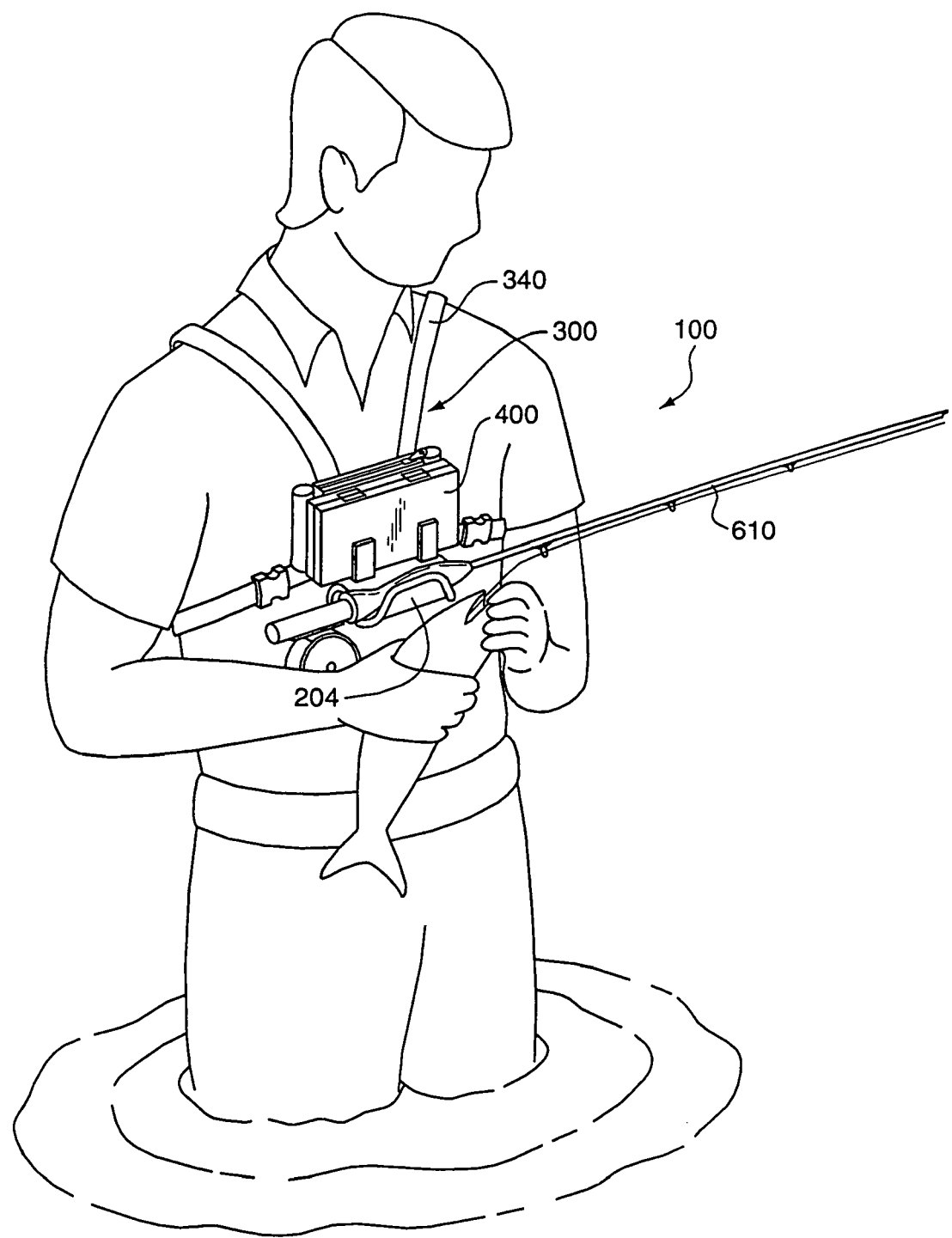
FIG. 1 depicts a chest fly box system in accordance with the invention in use by a fisherman standing in a stream.

In FIG. 1, a chest fly box system 100 in accordance with the invention is depicted in use by a fisherman standing in a stream. A harness 300 having straps 340, which loop over the fisherman's shoulders crossing on his back around under his armpits, carries a base piece 202 (hidden in this view by other elements of system 100), which supports a pocket-sized fly box 400. Also depicted is a fishing rod 610 held by fishing rod holder 204 in a substantially horizontal orientation at the chest of the fisherman, thereby freeing up both hands of the fisherman.

The term "chest fly box" is a term generally used in the art to designate a fly box carried on the chest of a fisherman. Inherently, a chest fly box is limited in volume and weight. As explained above, an advantage of a chest fly box system in accordance with the invention is that virtually any pocket-sized fly box can be easily adapted for use in the system as a chest fly box. The term "pocket-sized fly box" as it is used in this specification refers generally to a fly box having dimensions in the following approximate ranges: length, 10 to 18 cm; width, 6 to 13 cm; height, 2 to 4 cm. It should be understood, however, that the term "pocket-sized fly box" does not designate a specific geometry or range of dimensions.

Although the term "fly box" is used throughout this specification, it should be understood that other terms, such as "lure box", could also have been used equally well. In other words, a system in accordance with the invention may be used to support and carry at the chest of a fisherman any "pocket-sized" box or container used to carry fishing equipment. A system in accordance with the invention, therefore, is useful in many various fishing environments, such as fly-fishing, spincasting, and others. It is also clear that novel features of the invention, such as a fishing rod holder and a bottle holder, can be incorporated in various types of fishing gear, not restricted to fly-fishing only.

In a chest fly box system in accordance with the invention, a pocket-sized fly box is supported by a support piece, which is suspended at the chest of a fisherman by a harness, when in use. At various places, this specification generally describes a pocket-sized fly box being attached or affixed to a base piece or a support plate. In a preferred embodiment, as described in this specification, a pocket-sized fly box is affixed to portions of a harness using hook-and-loop fasteners; in other words, the actual points of attachment of the fly box to the system are to the fabric of the harness, rather than to the base piece itself. It should be understood, however, that in a chest fly box system in accordance with the invention, the actual point of attachment of a fly box to the system may be directly to a base piece, with the base piece being supported by a harness in a different configuration from the one depicted in the drawings and described herein as a preferred embodiment.

2. Detailed Description

Figure 2:
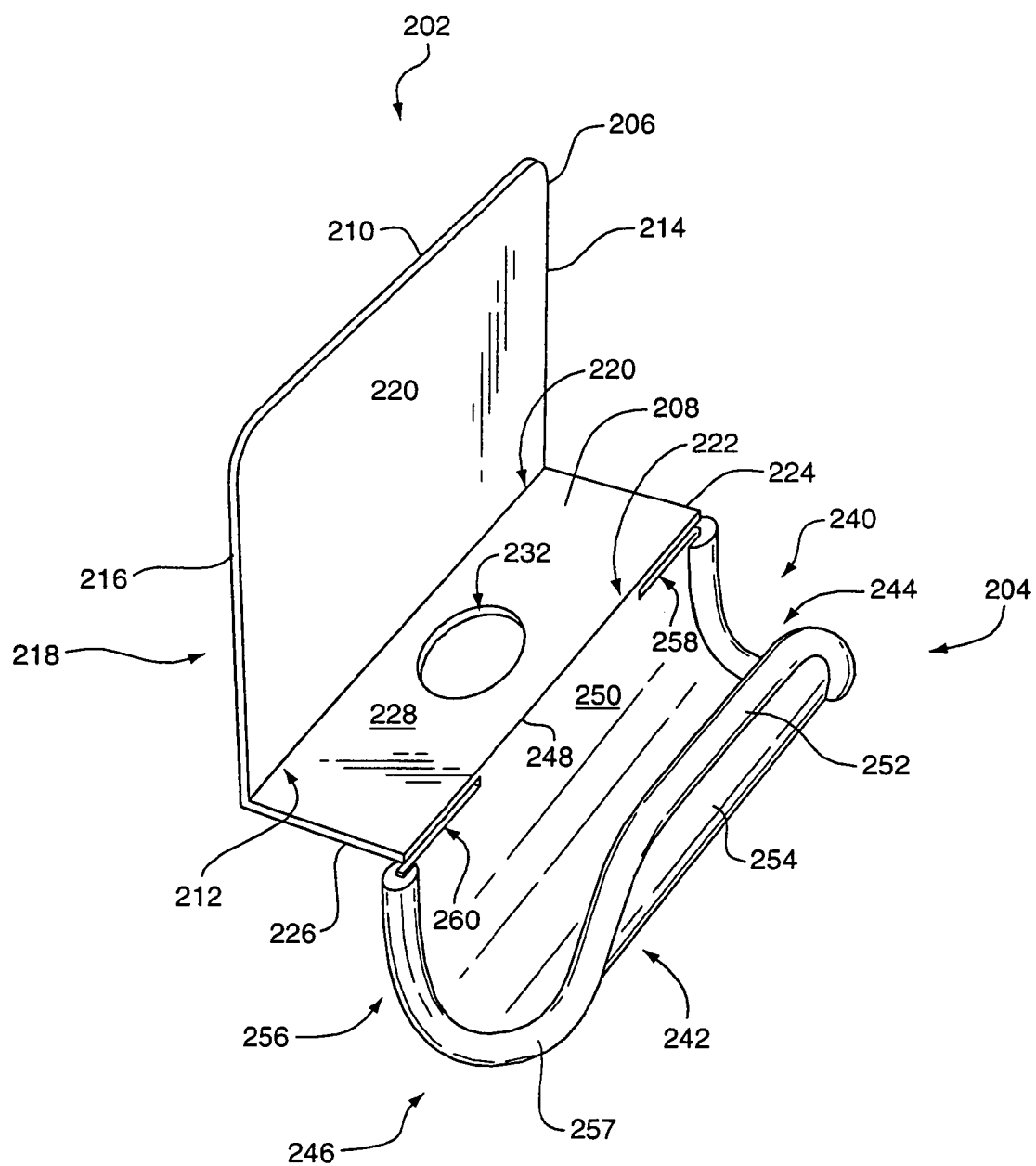
FIG. 2 is a perspective view of a base piece and a fishing rod holder of a chest fly box system in accordance with the invention.

Depicted in FIG. 2 is a perspective view of base piece 202 and fishing rod holder 204. Base piece 202 comprises a vertical chest plate 206 and a horizontal support plate 208. Vertical chest plate 206 and horizontal support plate 208 form a right angle and typically are made from the same piece of material, for example, by making a 90 degree bend in a piece of aluminum sheeting. Chest plate 206 has an upper edge 210, a lower edge 212, a first side edge 214, and a second side edge 216, a chest-side surface 218 and an outside surface 220. A chest plate length is the horizontal distance between first side edge 214 and second side edge 216, and the chest plate height is the vertical distance between lower edge 212 and upper edge 210. Support plate 208 has an inner edge 220, an outer edge 222, a first side edge 224 and a second side edge 226, a top surface 228, a bottom surface 230 (hidden), and preferably a "knuckle hole" 232 that serves to accommodate a "knuckle" that is commonly found on the front edge of a fly box having a latch for securing a lid. The support plate has a support plate width, defined by the dimension of edges 224, 226, and a support plate length, defined by inner edge 220. In a preferred embodiment, as depicted in FIG. 2, lower edge 212 and inner edge 220 are the same because they are formed by bending a metal sheet. In other embodiments, inner edge 220 is contiguous with lower edge 212 of chest plate 202. The support plate width and support plate length are adequate to support a pocket-sized fly box in its vertical closed position, as depicted in FIG. 1.

In an embodiment of the invention as depicted in FIG. 2, fishing rod holder 204 is attached to outer edge 222 of support plate 208. It is clear, however, that the novel feature of fishing rod holder 204 may be attached in a chest fly box system in a different location; or a fishing rod holder may be attached to other objects supported by or carried on the person of a fisherman, for example, from a large fly box, a fishing vest, or a belt. Fishing rod holder 204 comprises construction material that is sufficiently rigid and strong to support a fly-fishing rod in the desired horizontal position, but is sufficiently flexible to be stretched slightly as a fishing rod is "snapped into" the holder. Thus, it is desirable that fishing rod holder 204, as depicted in FIG. 2, possess a spring characteristic that allows it to be stretched and then clamped down upon the handle of a fishing rod. Fishing rod holder 204 comprises a U-shaped trough 240 having an axial length and a width, the length determining a horizontal length direction. Holder 204 has a bottom 242, a first open end 244, a second open end 246 opposite the first open end in the length direction, a proximate upper edge 248 adjacent base piece 202, a proximate side 250 extending downwards from proximate upper edge 248, a distal upper edge 252 opposite proximate upper edge 248, a distal side 254 extending downwards from distal upper edge 252, the distance between proximate side 250 and distal side 254 equal to the width. Fishing rod holder 204 has an upper opening 256 between proximate upper edge 248 and distal upper edge 252, upper opening 256 and the width being of adequate size to accommodate and to hold securely a handle of a fishing rod aligned in the length direction. The vertical distance between bottom 242 and proximate upper edge 248 determines the height of fishing rod holder 204. Preferably, distal upper edge 252, proximate upper edge 248 and outer edge 222 of support plate 208 are approximately in a single horizontal plane when outer surface 220 of vertical chest plate 206 is in a vertical plane. In this configuration, edges 222, 248, and 252, together with support plate 208, provide support on which a pocket-sized chest fly box may rest in a horizontal flat position. In FIG. 2, outer edge 222 of support plate 208 and proximate upper edge 248 of fishing rod holder 204 are formed by a bend in a single piece of construction material. As depicted in FIG. 2, therefore, chest plate 206, support plate 208, and fishing rod holder 204 are formed using a single piece of construction material, for example, a piece of aluminum sheeting having a thickness of about 1.0 mm. Preferably, edge cushion 256 covers the exposed edges of fishing rod holder 204 to protect the fishing rod from scratching and also to provide a small lip on distal edge 252 to improve the grip on the fishing rod being held.

Dimensions of chest plate 206, horizontal support plate 208, and fishing rod holder 204 are constrained only by the requirements to support and secure a pocket-sized fly box and a fishing rod. Therefore, their dimensions may vary considerably, depending on particular applications for which they are designed. A preferred embodiment in accordance with the invention, designed for a pocket-sized fly box and a fishing rod having a common-sized handle, has the following dimensions: chest plate length, 10.2 cm; chest plate height, 9.0 cm; support plate width, 3.1 cm; axial length of fishing rod holder 204, 10.2 cm; width of fishing rod holder 204, 3.0 cm; height of fishing rod holder, 3.0 cm. The dimensions of knuckle hole 232 may also vary depending on particular applications; a circular hole having a diameter of about 2.0 cm located at the center of support plate 208 is typically sufficient to accommodate the latch knuckle of a pocket-sized fly box.

Although fishing rod holder 204 is depicted in the drawings as part of chest fly box system 100, it is clear that the novel features of the fishing rod holder may be used separately from system 100. For example, a fishing rod holder for temporarily holding a fishing rod in a horizontal orientation may include one of various types of clamps to hold a fishing rod in a substantially horizontal orientation, and one of various types of fasteners to secure the clamp to the body of a fisherman. Therefore, a generalized method in accordance with the invention of holding a fishing rod in a substantially horizontal position comprises steps of attaching a clamp 204 to the body of a fisherman, and clamping a fishing rod 610 in the clamp in said substantially horizontal position. A fishing rod holder may be used with a conventional portable system for holding, storing and transporting fishing equipment, such as a fly box to which the fishing rod holder is attached. Preferably, the novel fishing rod holder is used in a chest fly box system 100 for holding fishing equipment, comprising a base piece for supporting a pocket-sized fly box and a hook-and-loop fastener having a hook portion and a loop portion, one of the hook-and-loop portions connected to the base piece, and the other of the hook-and-loop portions connected to the pocket-sized fly box.

In a preferred embodiment of fly box system 100 in accordance with the invention, a first slot 258 between outer edge 222 and proximate upper edge 248 is located adjacent to the first open end 240. Similarly, a second slot 260 between outer edge 222 and proximate upper edge 248 is located adjacent to second open end 246. The opening of slits 258 and 260 is 1.5 mm to 2 mm wide to accommodate the fingers 310, 314 of harness 300, as described below. The lengths of slots 258 and 260 in the horizontal direction are approximately 2.2 cm.

Figure 3:
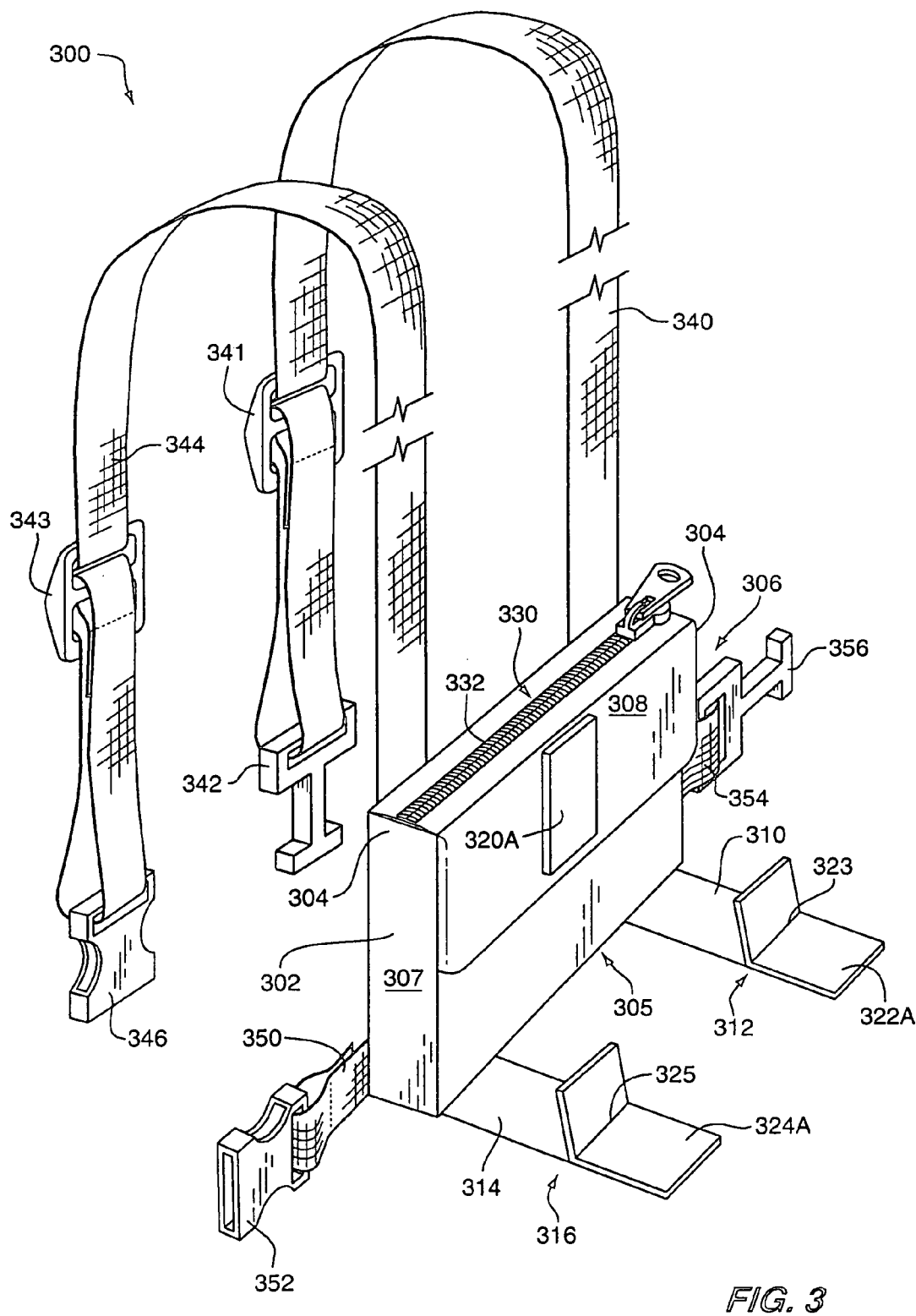
FIG. 3 is a view of a harness of a chest fly box system in accordance with the invention.
Figure 4:
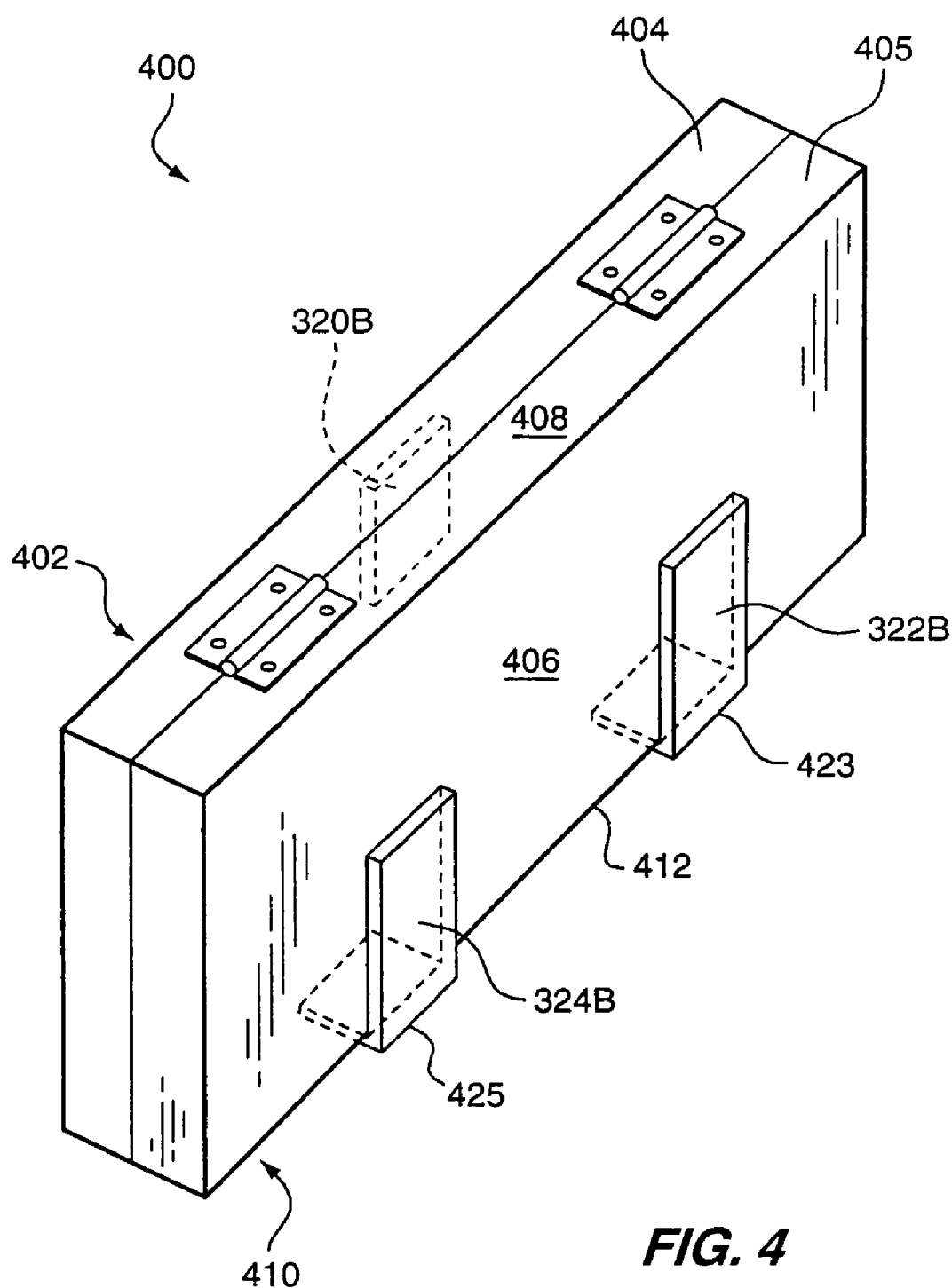
FIG. 4 depicts a pocket-sized fly box to which loop portions of hook-and-loop fasteners in accordance with the invention have been attached.

Harness 300, depicted in FIG. 3, preferably comprises one or a combination of various types of flexible woven material, for example, canvas, nylon or other synthetic fabric, and nylon or other synthetic webbing. Of course, harness 300 may comprise flexible non-woven material, for example, leather and durable plastic. Harness 300 has a chest portion 302 for covering chest surface 218 of chest plate 206. Chest portion 302 has a top region 304 and bottom 305, a first side 306 (hidden in the view of FIG. 3) and a second side 307, opposite side 306. A sleeve portion 308 at top region 304 encloses upper edge 210 of chest plate 206, and thereby helps to secure base piece 202 in the harness. Sleeve portion 308 typically extends downward about half of the vertical distance from upper edge 210 to lower edge 212. Harness 300 further has a first finger 310 at bottom 305 having a first flange 312, and a second finger 314 at bottom 305 having a second flange 316. When harness 300 is mounted on base piece 202, first finger 310 passes along bottom surface 230 of support plate 208 through slot 258. Flange 312 is located on first finger 310 just beyond and contiguous with outer edge 222 at slot 258. Flange 312 has a thickness greater than the width of slot 258. When flange 312 is properly seated in slot 258, it creates sufficient tension in finger 310 to help secure base piece 202 in harness 300. Similarly, second finger 314 passes along bottom surface 230 of support plate 208 through slot 260, and second finger 314 together with flange 316 helps secure base piece 202 in harness 300. Fingers 310, 314 comprise woven material having a thickness of about 1.5 mm. In a preferred embodiment, as depicted in FIGS. 1 and 3, harness 300 comprises hook portions 320a, 322a, and 324a of hook-and-loop fasteners 320, 322 and 324, respectively. Hook portion 320a is affixed to sleeve portion 308, typically centered and conveniently affixed, for example, by sewing stitches or by an adhesive. As depicted in FIG. 4, a corresponding loop portion 320b is affixed to pocket-sized fly box 400 at a place appropriate such that fastener 320 will help secure fly box 400 onto base piece 202 when fly box 400 is in a vertical closed position. Loop portions 322b and 324b, corresponding to hook portions 322a and 324a, are affixed to pocket-sized fly box 400 to secure fly box 400 in chest fly box system 100. Fly box 400 has a top surface 402 of lid 404, a bottom 405 having a surface 406, a rear surface 408, a front surface 410, and front bottom edge 412. Loop portions 322b and 324b have bends 423, 425, respectively, aligned with edge 412. Hook portion 322a has a seam 323, and hook portion 324a has a seam 325, seams 323, 325 corresponding to bends 423, 425. Fasteners 322, 324 serve as hinges enabling fly box 400 to rotate 90 degrees downwards from its vertical closed position to a horizontal flat position. In its horizontal flat position, bottom 406 of fly box 400 is supported by support plate 208 and distal upper edge 252. Hook portions 320a, 322a, 324a typically are permanently affixed at appropriate locations to harness 300. Corresponding loop portions 320b, 322b, 324b are typically attached to fly box 400 by the fisherman, prior to use. A significant advantage of chest fly box system 100 is that the fisherman may affix portions 320*b*, 322*b*, 324*b* to any number of fly boxes of varying sizes and shapes, needing only to align portions 320*b*, 322*b*, 324*b* on each individual fly box with corresponding portions 320*a*, 322*a*, 324*a*.

A feature of the invention, therefore, is a method of detachably securing a plurality of pocket-sized fly boxes 400 to the chest of a fisherman, whereby the pocket-sized fly boxes 400 may be of different types. A method in accordance with the invention provides a fly box attachment set 322, 324 comprising a chest attachment portion, for example, hook portions 322*a*, 324*a*, and plurality of fly box attachment portions, for example, a plurality of loop portions 322*b*, 324*b*. One attaches each of the plurality of fly box attachment portions to a different one of the plurality of fly boxes, and attaches the chest attachment portion to the chest of a fisherman. In using such method, one first attaches a fly box attachment portion attached to one of the plurality of fly boxes to the chest attachment portion. Afterwards, one detaches the first of the fly box attachment portions from the chest attachment portion and attaches the fly box attachment portion of another of the fly boxes to the chest attachment portion. As noted above, the plurality of fly boxes can be of different types, and a method allows various types of fly boxes to be used. Typically, a fly box attachment portion 322*b*, 324*b* and a chest attachment portion 322*a*, 324*a* together comprise a hinge 322, 324, and a fisherman may rotate the fly box attached to his chest from a first position to a second position utilizing the hinge. A preferred embodiment provides a vertical hold set 320 comprising a plurality of fly box units 320*b* and a chest unit 320*a*, and includes attaching each of the fly box units 320*b* to one of the plurality of fly boxes 400, attaching the chest unit 320*a* to the chest of a fisherman; and attaching the fly box unit 320*b* to the chest unit 320*a* to hold the fly box 400 in a substantially vertical orientation on the chest of the fisherman. The plurality of fly boxes 400 may be of different types.

Chest portion 302 preferably is soft compared to the rigid materials commonly used in chest fly boxes, such as hard plastic or aluminum. Preferably, chest portion 302 of harness 300 includes a pocket 330 having an opening 332 at chest portion top 334. Pocket 330 is useful for carrying larger fishing equipment, such as leaders and tippets, or small personal items. Pocket 330 typically has an expansion capacity of about 1.5 cm.

As depicted in FIG. 3, harness 300 further comprises: a first strap 340 attached to top region 304 and having a length adjustor 341 and a male clip end 342, a second strap 344 attached to top region 304 and having a length adjustor 343 and female clip end 346. At bottom 305 of chest portion 302, a first lateral tab 350 is attached to female clip end 352, and a second lateral tab 354 is attached to male clip end 356. When chest fly box system 100 is in use, straps 340, 344 pass over the shoulders of a fisherman and cross on his back so that male end 342 is clipped into female end 352, and male end 356 clips into female end 346. When chest fly box system 300 is being stored or carried, when not in active fishing service, straps 340, 344 can be wrapped around chest portion 302 and bottom surface 406; then male end 356 can be clipped into female end 352 to hold straps 340, 344 in place.

Figure 5:
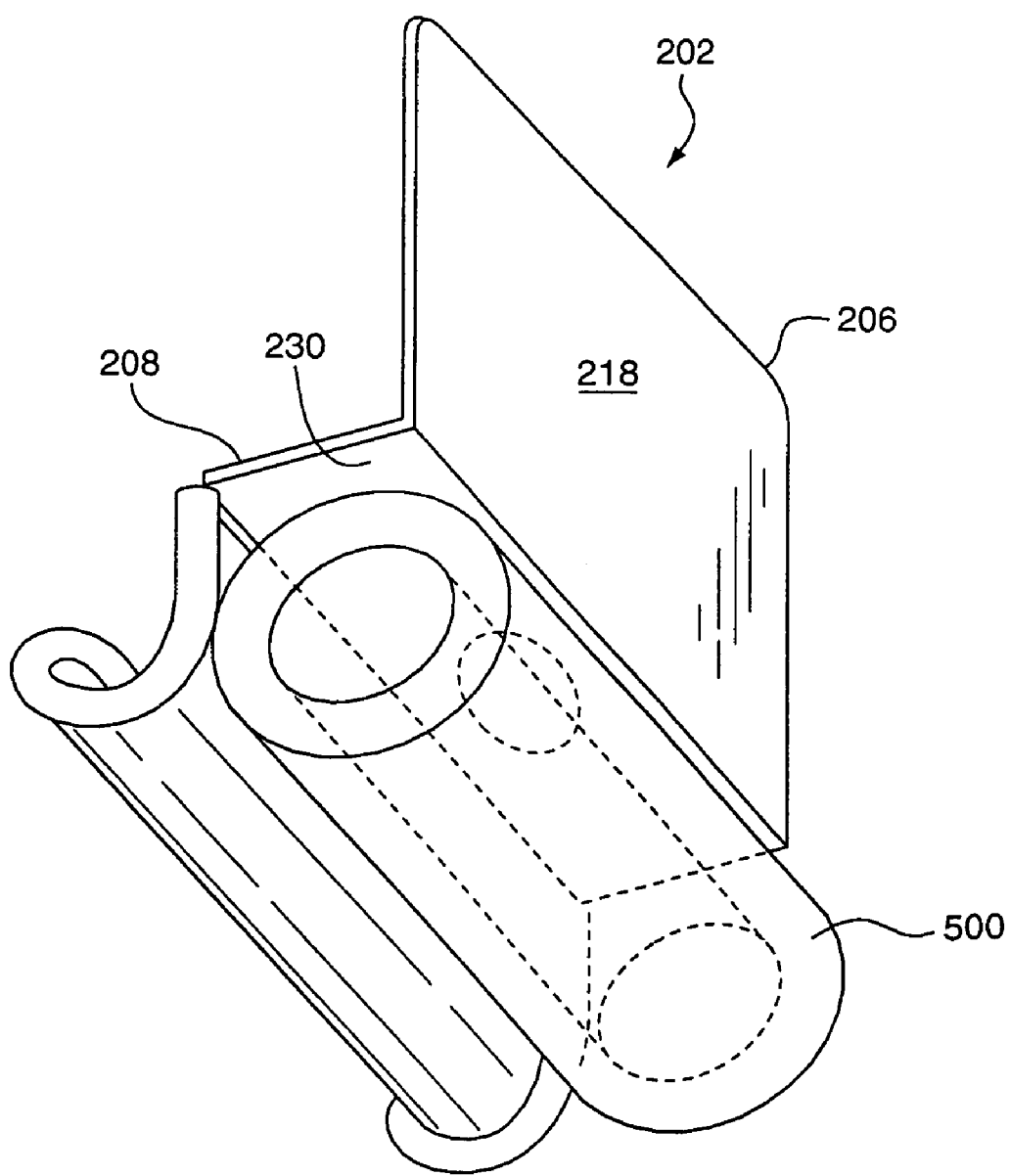
FIG. 5 is a perspective view of a base piece showing a base piece to which a bottle holder in accordance with the invention is attached.
Figure 6:
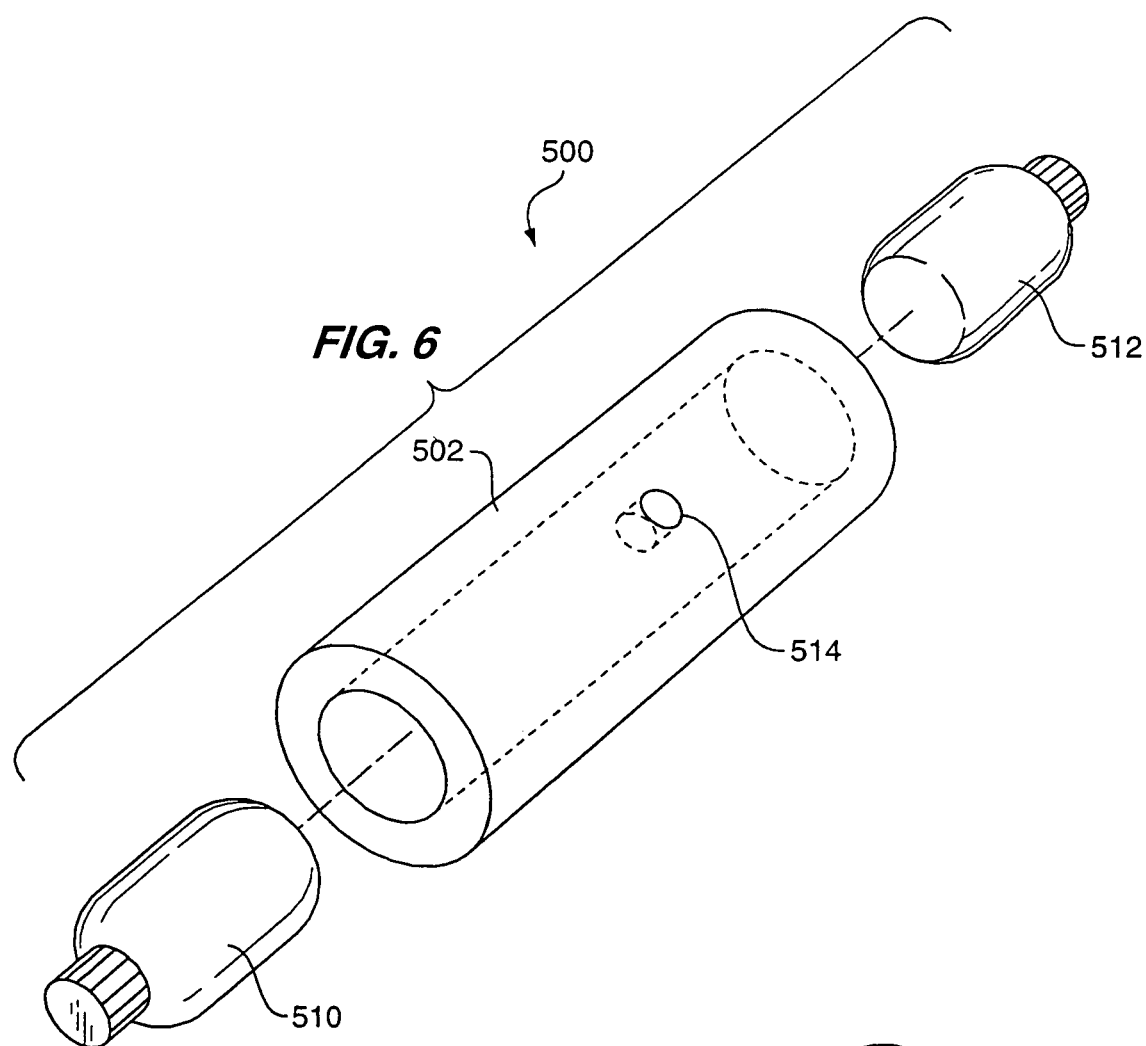
FIG. 6 shows a preferred embodiment of a bottle holder comprising circular tubing.
Figure 7:
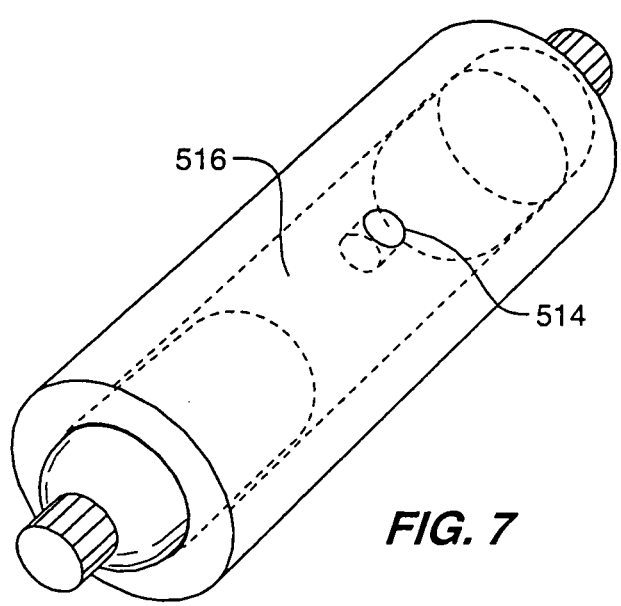
FIG. 7 shows a bottle holder of FIG. 6 holding standard fluid bottles.

Preferably, chest fly box system 100 further comprises a bottle holder 500 for holding a bottle in a horizontal position. FIG. 5 is a perspective view of base piece 202 showing chest-side surface 218 of chest plate 206, and bottom surface 230 of support plate 208. Preferably, bottle holder 500 is attached to bottom surface 230 of support plate 208, as depicted in FIG. 5. As depicted in FIG. 6, bottle holder 500 preferably comprises resilient circular tubing 502 having an inside diameter to accommodate standard fluid bottles. For example, circular tubing 502 may comprise neoprene rubber tubing having an inside diameter of 2.5 cm, an axial length of about 8.5 cm, and a wall thickness of approximately 7 mm. Such tubing provides sufficient rigidity and strength to support two fluid bottles 510, 512 in a horizontal position, each inserted bottom-first into an end of the tubing, as in FIG. 7. In a preferred embodiment, tubing 502 includes vent hole 514 at the center of the tubing to inhibit formation of a partial vacuum in the interior cylindrical space 516 between bottles inserted into the tubing. Venthole 514 typically is circular, having a diameter of about 5 mm. Although bottle holder 500 is shown in the drawings as a component of chest fly box system 100, it is clear that this novel feature may be used separately from system 100.

Figure 8:
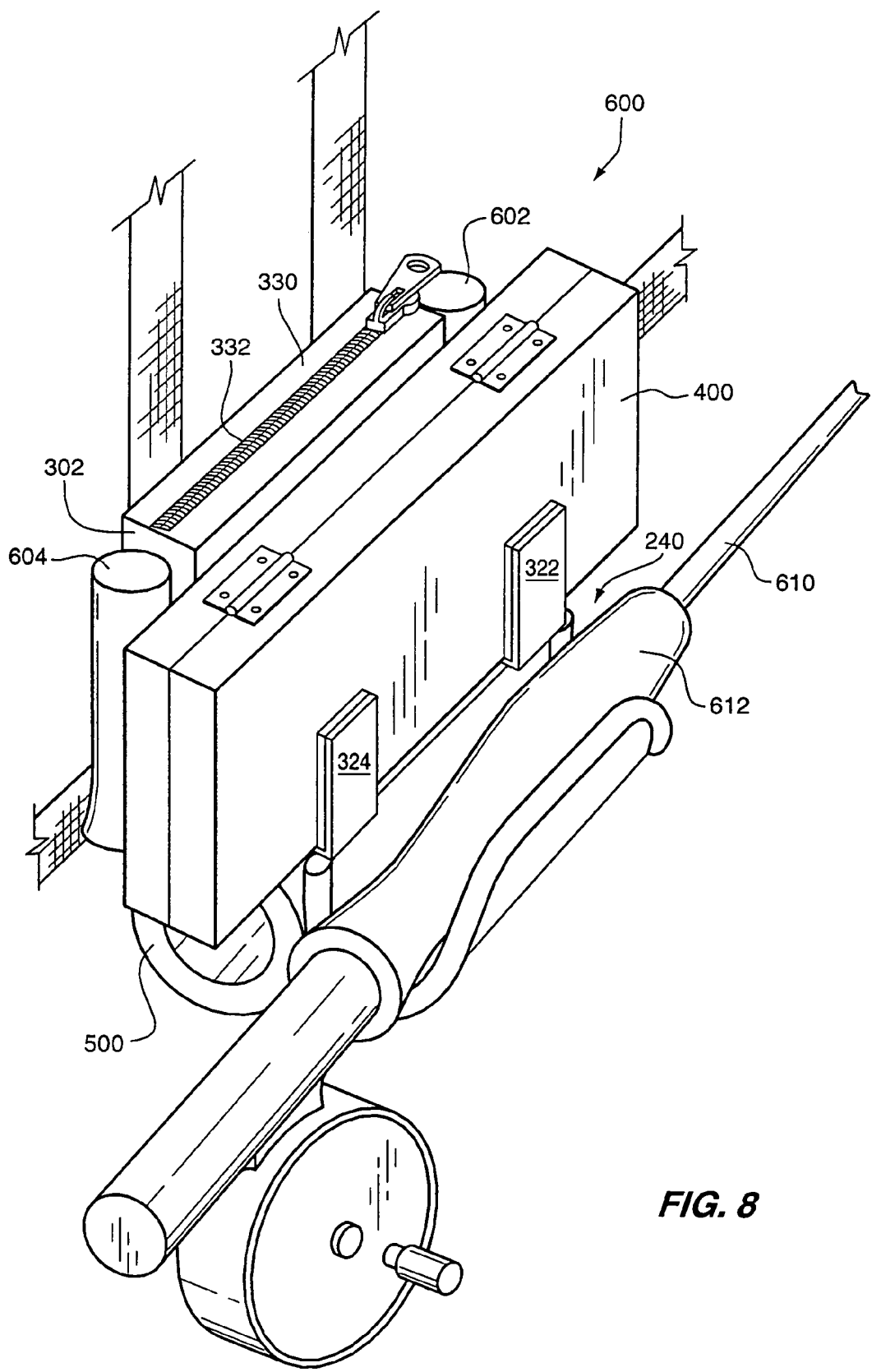
FIG. 8 is a perspective view of a chest fly box system in accordance with the invention in which a pocket-sized fly box in a vertical closed position is disposed on a support plate, secured in part by rotatable hinge fasteners.

In FIG. 8, a perspective view of portion 600 of a chest fly box system 100 in accordance with the invention is depicted. Pocket-sized fly box 400 in a vertical closed position is disposed on support plate 208 (not shown), secured in part by rotatable hinge fasteners 322, 324. Chest portion 302 having pouch 330 with opening 332 is disposed between fly box 400 and the chest (not shown) of a fisherman. Tubes 602, 604 of commercially available pig-tail retractors are depicted mounted to sides 306, 307 of chest portion 302. Bottle holder 500 is attached to bottom 230 of support plate 208. A fishing rod 610 is being supported in fishing rod holder 204 in a horizontal orientation. Fishing rod handle 612 is disposed in U-shaped trough 240.

Figure 9:
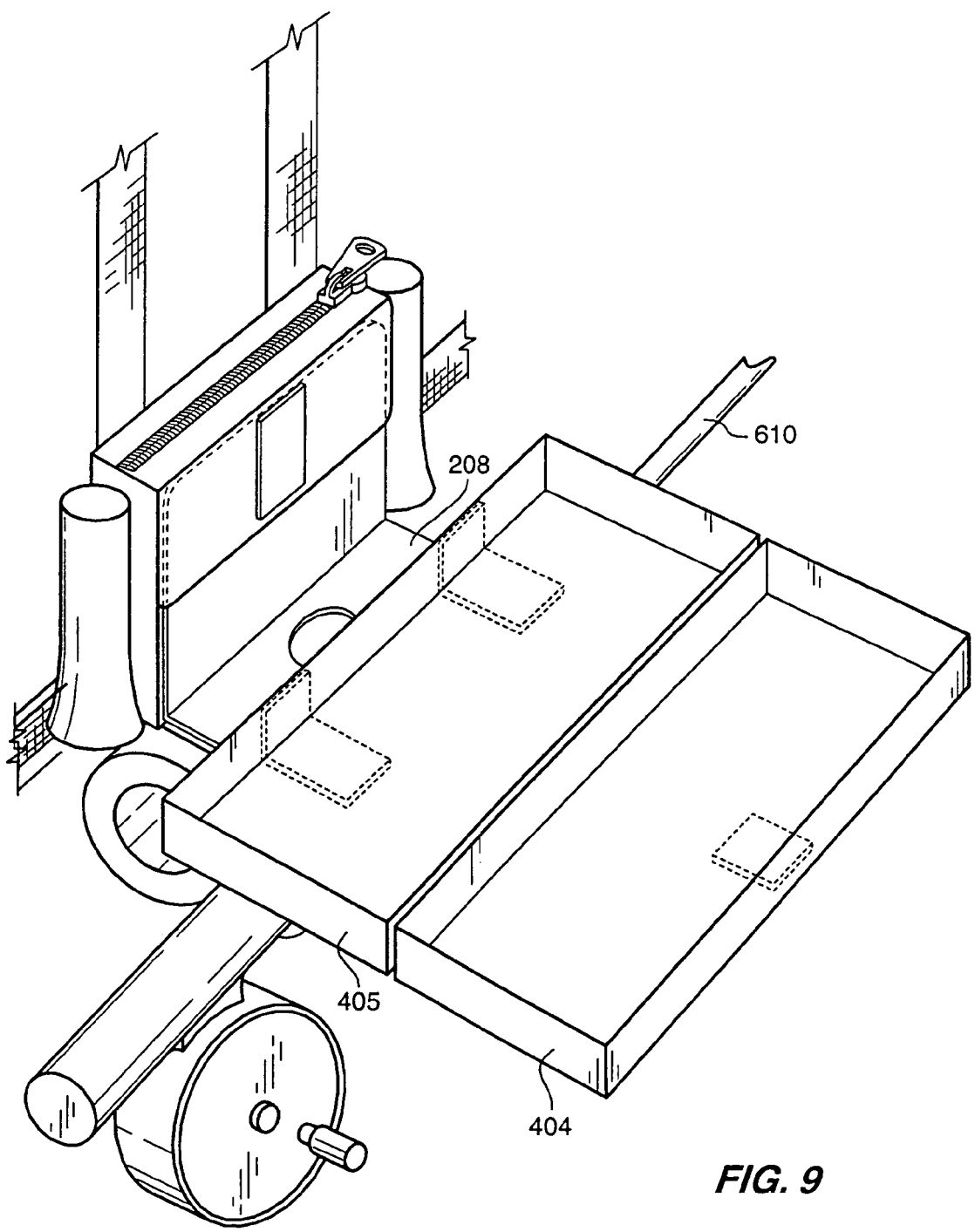
FIG. 9 is a perspective view as in FIG. 8 in which the pocket-sized fly box has rotated downwards 90 degrees about the hinge fasteners into a horizontal flat position and lies opened.

FIG. 9 is a perspective view as in FIG. 8 in which the pocket-sized fly box has rotated downwards 90 degrees about rotatable hinge fasteners 322, 324 into a horizontal flat position. Bottom 405 of opened fly box 400 is resting on support plate 208 and distal upper edge 252 (hidden from view).

There has been described a chest fly box system and novel devices, which are useful by themselves or integrated as elements of a chest fly system. Also, a method for securing a fly box in a chest fly box system using a rotatable hook-and-loop fastener has been described. It should be understood that the particular embodiments shown in the drawings and described within this specification are for purposes of example and should not be construed to limit the invention, which will be described in the claims below. Further, it is evident that those skilled in the art may now make numerous uses and modifications of the specific embodiment described, without departing from the inventive concepts. For example, the locations of hook portions 320*a*, 322*a*, 324*a* and corresponding loop portions 320*b*, 322*b*, 324*b* may be switched in different embodiments. It is also evident that the device elements and steps recited may in some instances be performed in a different order; or equivalent structures may be substituted for the various structures described; or a variety of different materials may be used. Consequently, the invention is to be construed as embracing each and every novel feature and novel combination of features present in and/or possessed by the system, devices, and method described.

The invention claimed is:

1. A chest fly box system for holding fishing equipment, comprising:
   a base piece for supporting a pocket-sized fly box having an inside;
   a harness that secures said base piece to the chest of a fisherman, with said base piece resting on the front of said chest;
   a hinge for permitting movement of said fly box from a horizontal to a vertical position; and
   a fastener adapted to releasably secure said pocket-sized fly box to said base piece so said inside of said fly box can be accessed without removing said fly box from said base piece;

wherein said fastener is adapted so that said fly box can be removed from said base piece without using a tool.

2. A chest fly box system as in claim 1, said fastener configured to secure a pocket-sized fly box to said base piece when the fly box is in a vertical closed position and when it is in a horizontal flat position.

3. A chest fly box system as in claim 1 and further including a fishing rod holder contiguous to said base piece and configured to hold a fishing rod in a horizontal orientation under a pocket-sized fly box supported on said base piece.

4. A chest fly box system as in claim 1, characterized in that said base piece comprises a vertical chest plate and a horizontal support plate, said vertical chest plate and said horizontal support plate forming a right angle, said chest plate having an upper edge, a lower edge, a chest-side surface and an outside surface, said support plate having an inner edge, an outer edge, a first side edge and a second side edge, a top surface, a bottom surface, a support plate width, and a support plate length, said inner edge contiguous with said lower edge of said chest plate, said support plate width and said support plate length being adequate to support a pocket-sized fly box in its vertical closed position.

5. A chest fly box system as in claim 4, further comprising a fishing rod holder, said fishing rod holder being attached to said base piece.

6. A chest fly box system as in claim 3, characterized in that said fishing rod holder comprises rigid construction material.

7. A chest fly box system as in claim 6, characterized in that said fishing rod holder comprises a U-shaped trough having a length and a width, said length determining a horizontal length direction, a first open end, a second open end opposite said first open end in said length direction, a proximate upper edge adjacent said base piece, and a distal upper edge opposite said proximate upper edge.

8. A chest fly box system as in claim 7, characterized in that said distal upper edge, said proximate upper edge and said outer edge of said support plate are in a single horizontal plane when said outer surface of said vertical chest plate is in a vertical plane.

9. A chest fly box system as in claim 8, characterized in that said outer edge of said support plate and said proximate upper edge of said fishing rod holder are formed by a bend in a single piece of construction material.

10. A chest fly box system as in claim 9, characterized in that said bend comprises a right angle.

11. A chest fly box system as in claim 10, further characterized by fasteners that secure a pocket-sized fly box to said base piece when the pocket-sized fly box is in a vertical closed position and when it is in a horizontal flat position.

12. A chest fly box system as in claim 11, characterized in that said harness is attached to said inner edge of said support plate and said upper edge of said chest plate.

13. A chest fly box system as in claim 12, characterized by a first slot between said outer edge and said proximate upper edge adjacent to said first open end, and by a second slot between said outer edge and said proximate upper edge adjacent to said second open end, and characterized in that said harness comprises flexible material and has a chest portion for covering said chest surface of said chest plate, said chest portion having a top region and a bottom, a sleeve portion at said top region that encloses said upper edge of said chest plate, a first finger at said bottom having a first flange, and a second finger at said bottom having a second flange, said first finger located in said first slot and being secured by said first flange, and said second finger located in said second slot and being secured by said second flange.

14. A chest fly box system as in claim 13, characterized in that said sleeve portion, said first flange and said second flange comprise hook-and-loop fabric that attaches to corresponding pieces of hook-and-loop fabric on a pocket-sized fly box when said pocket-sized fly box is located in a vertical closed position on said support plate.

15. A chest fly box system as in claim 14, characterized in that said first flange and said second flange are rotatable 90 degrees about said outer edge of said support plate when a pocket-sized fly box to which said flanges are attached is rotated downward from a vertical closed position on said support plate to a horizontal flat position.

16. A chest fly box system as in claim 15, characterized in that said chest portion of said harness includes a pocket, said pocket having an opening at said top region.

17. A chest fly box system as in claim 16, characterized in that said harness further comprises: a first strap attached to said top region and having a female clip end, a second strap attached to said top region and having a male clip end, a first lateral tab attached to said bottom and having a male clip end, and a second lateral tab attached to said bottom and having a female clip end.

18. A chest fly box system as in claim 16, further comprising a pig-tail retractor attached to a side of said chest portion.

19. A chest fly box system as in claim 4, further comprising:
a bottle holder for holding a bottle in a horizontal position, said bottle holder attached to said bottom surface of said support plate.

20. A chest fly box system as in claim 19, characterized in that said bottle holder comprises neoprene rubber tubing having an inside diameter of 2.5 cm.

21. A chest fly box system as in claim 1, further comprising:
a bottle holder for holding a bottle in a horizontal position, said bottle holder attached to said base piece.

22. A chest fly box system as in claim 3, characterized in that said fishing rod holder comprises a U-shaped trough.

23. A chest fly box system as in claim 3, characterized in that said fishing rod holder comprises a clamp.

24. A chest fly box as in claim 1 wherein said fastener is further adapted so that said fly box can be released from said base piece while all parts of said fastener remain attached to either said fly box or said base piece.

25. A portable system for holding, storing and transporting fishing equipment, comprising:
an integrated fly box support and a fishing rod holder made of a single piece of rigid material, and including a base piece;
a fastener adapted to releasably secure a pocket-sized fly box having an inside to said base piece so said inside of said fly box can be accessed without removing said fly box from said base piece and said fly box can be released from said base piece without using a tool;
said fishing rod holder configured to hold a fishing rod in a horizontal orientation while said inside of said fly box is being accessed; and
a hinge for permitting movement of said fly box from a horizontal to a vertical position.

26. A chest fly box as in claim 25 wherein said fastener is further adapted so that said fly box can be released from said base piece while all parts of said fastener remain attached to either said fly box or said base piece.

* * * * *